(12) United States Patent
Ene (10) Patent No.: US 6,928,277 B1
(45) Date of Patent: Aug. 9, 2005

(54) METHOD FOR HANDLING GLOBAL CHALLENGE AUTHENTICATION REGISTRATION, MOBILE SWITCHING CENTER AND MOBILE STATION THEREFOR

(75) Inventor: Daniel Marian Ene, Montreal West (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 09/546,909

(22) Filed: Apr. 10, 2000

(51) Int. Cl.[7] .............................................. H04M 3/16
(52) U.S. Cl. ..................... 455/411; 455/435.1; 455/561
(58) Field of Search ................................ 455/411, 410, 455/414.1, 435.1, 435.2, 550.1, 560, 561, 461, 465, 450, 460, 90, 95, 575; 380/247, 248, 270, 274

(56) References Cited

U.S. PATENT DOCUMENTS

| | | | |
|---|---|---|---|
| 5,329,573 A | | 7/1994 | Chang et al. ................. 379/58 |
| 5,668,875 A | * | 9/1997 | Brown et al. ................ 380/248 |
| 5,953,652 A | * | 9/1999 | Amin et al. ................ 455/410 |
| 6,014,085 A | * | 1/2000 | Patel ........................... 455/410 |
| 6,236,852 B1 | * | 5/2001 | Veerasamy et al. ......... 455/411 |
| 6,397,056 B1 | * | 5/2002 | Bugnon et al. ............. 455/411 |
| 6,584,310 B1 | * | 6/2003 | Berenzweig ............. 455/432.1 |
| 6,665,530 B1 | * | 12/2003 | Broyles et al. ............. 455/411 |
| 6,668,166 B1 | * | 12/2003 | Kanabar ..................... 455/411 |

FOREIGN PATENT DOCUMENTS

| | | |
|---|---|---|
| JP | 10-285630 | 10/1998 |
| WO | WO 97/36447 | 10/1997 |
| WO | WO 99/49692 | 9/1999 |

* cited by examiner

*Primary Examiner*—Edward F. Urban
*Assistant Examiner*—Thuan Nguyen
(74) *Attorney, Agent, or Firm*—Jenkens & Gilchrist, P.C.

(57) ABSTRACT

The present invention relates to a method for handling global challenge authentication registration in a cellular telecommunications network. A Mobile Switching Center (MSC) receives a registration message from a mobile station, and it determines whether it has capabilities for bypassing global challenge authentication. In instances where the MSC has capabilities for bypassing global challenge authentication, it verifies whether a Visitor Location Register (VLR) relating thereto has a record for the mobile station from which the registration message has been received, and if so, it bypasses the global challenge authentication for the mobile station. When the VLR does not have a record for the mobile station from which the registration message has been received, it performs the global challenge authentication. Alternatively, if the MSC does not have capabilities for bypassing global challenge authentication, it performs the global challenge authentication for the mobile station from which the registration message has been received. The invention also relates to a MSC and a mobile station for performing the method.

13 Claims, 7 Drawing Sheets

METHOD FOR HANDLING GLOBAL CHALLENGE AUTHENTICATION REGISTRATION, MOBILE SWITCHING CENTER AND MOBILE STATION THEREFOR

BACKGROUND OF THE INVENTION

1. Technical Field of the Invention

This invention relates to cellular telecommunications networks, and more particularly to a method for handling global challenge authentication registration, and to a Mobile Switching Center (MSC) and a mobile station performing such global challenge authentication registration handling.

2. Description of Related Art

Ever since their introduction on the market, mobile stations have changed the way people communicate. Now, it is possible to reach a person almost anywhere, using only one number. The number is no longer linked to a location, but is rather linked to a mobile station that communicates through a radio interface with a cellular network. So wherever the mobile station is located, i.e. within the cellular network coverage, it can originate or receive a call by means of the radio interface. For originating a call through the cellular network, the mobile station has to identify itself by providing its Mobile Identification Number (MIN) and Electronic Serial Number (ESN). The MIN/ESN allows the cellular network to recognize which mobile station is calling, so to charge fees incurred for the call appropriately.

A problem that has emerged with the ever-increasing popularity of mobile stations is the cloning. The cloning is performed by "listening" to the radio interface to find a MIN/ESN, and programming a second mobile station with the same MIN/ESN. By doing so, the fees incurred for calls originated by the second mobile station are charged to the first mobile station. This method of fraud has caused important financial damages to cellular network providers and to owners of mobile stations.

To solve that problem, the security of cellular networks has been improved with authentication procedures to which the mobile stations must participate. One of the various authentication procedures that has been developed for D-AMPS (Digital-Advanced Mobile Phone Service) is called Global Challenge. This authentication procedure relies on using an algorithm called CAVE, and in an exchange of parameters between the mobile station and an authentication center. The authentication center stores a set of data for each mobile station including their MIN and ESN, along with an A-key and a Shared Secret Data (SSD) also called authentication data. The set of data is used as input parameters to the CAVE algorithm, along with a random number broadcast by the MSC servicing the mobile station, to verify authenticity of the mobile station.

More precisely, the Global Challenge procedure is performed on digital or analog control channel at system access, and involves validation of the authentication data received from the mobile station. System access is performed when the mobile station initiates or receives a call, or when the mobile station makes a periodic registration, typically every 10 minutes when the mobile station is powered on and idle, to inform the cellular network of its location.

However, when the mobile station is powered on, idle, and static for long periods of time, the periodic registration is continued with its repetitive global challenge performance, thus causing important processor load to the MSC. Furthermore, by repetitively performing global challenge at periodic registration while being static and idle, the risks of cloning the mobile station are increased due to the foreseeability of the periodic registration and the lack of movement and activity of the mobile station.

In order to overcome the disadvantage of existing solutions, it would be advantageous to have a method, which would allow better handling of the global challenge authentication performed in conjunction with the periodic registration. It would also be advantageous to provide a MSC and a mobile station that would support such better handling of the global challenge authentication at periodic registration.

SUMMARY OF THE INVENTION

The present invention provides a method for handling more efficiently global challenge authentication performed in conjunction with periodic registrations to reduce system load at a Mobile Switching Center (MSC). The present invention also provides a MSC that handles global challenge authentication at periodic registration so as to limit the load incurred on its processors without jeopardizing the existing added security provided by the authentication. Also provided herein is a mobile station (MS) that performs additional verification before repetitively and continuously performing global challenge authentication at periodic registration.

In one aspect, the present invention is a method for handling global challenge authentication registration in a cellular telecommunications network. In this method, a registration message is received at the MSC from a mobile station. The MSC determines whether it has capabilities for bypassing global challenge authentication. If the MSC has capabilities for bypassing global challenge authentication, the MSC verifies whether a Visitor Location Register (VLR) thereto related has a record for the mobile station from which the registration message has been received. If the VLR has a record for the mobile station from which the registration has been received, the global challenge authentication is bypassed for that mobile station. However, if the VLR does not have a record for the mobile station, the global challenge authentication is performed as usual. In instances where the MSC does not have capabilities for bypassing global challenge authentication, the global challenge authentication is performed for the mobile station.

In another aspect, the present invention is a Mobile Switching Center (MSC) for handling global challenge authentication registration. The MSC has an input port for receiving a registration message from a mobile station, and global challenge authentication logic. The global challenge authentication logic determines whether global challenge authentication is required for the mobile station from which the registration message has been received.

In yet another aspect, the present invention is a mobile station for handling global challenge authentication registration. The mobile station has an input/output module for receiving a broadcast message and for transmitting a periodic registration message. The mobile station also has a global challenge authentication calculation module for computing an authentication signature. Also incorporated in the mobile station is a discrimination module for determining whether the authentication signature is required for the periodic registration message, so that the authentication signature is computed and included in the periodic registration message when the discrimination module determines that it is required. However, if the discrimination module determines that the authentication signature is not required, than it is not computed and it is not included in the periodic registration.

BRIEF DESCRIPTION OF THE DRAWINGS

The invention will be better understood and its numerous objects and advantages will become more apparent to those skilled in the art by reference to the following drawings, in conjunction with the accompanying specification, wherein like reference numerals denote like parts, and in which.

DETAILED DESCRIPTION OF EMBODIMENTS

The present invention relates to global challenge authentication performed in conjunction with periodic registrations, and to a method and to a system to improve such global challenge authentication. For doing so, the present invention provides an improved method for handling more efficiently the global challenge authentication performed at periodic registration, so as to reduce system load induced on a Mobile Switching Center (MSC). The present invention also provides a MSC that handles global challenge authentication at periodic registration more efficiently so as to limit the load incurred on its processors, without jeopardizing the existing added security provided by the authentication. Also provided herein is a new mobile station (MS) that performs additional verifications before quite simply repetitively and continuously performing global challenge authentication at periodic registration.

Figure 1:
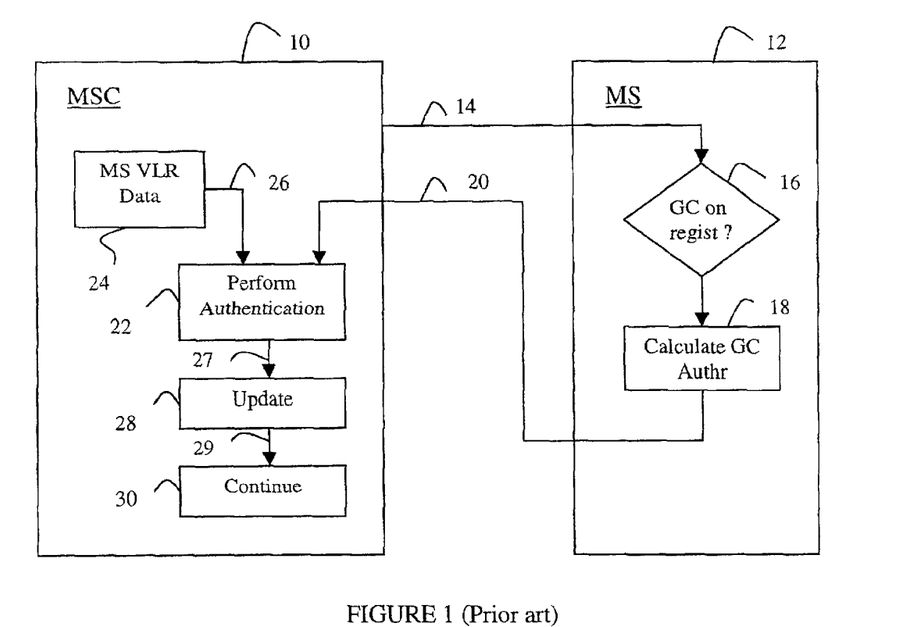
FIG. 1 is a functional block diagram of a method for handling global challenge authentication registration in accordance with the prior art.

Reference is now made to FIG. 1 wherein there is shown a functional block diagram of a method for handling global challenge authentication registration in accordance with the prior art. In such prior art methods, the MSC 10 broadcast a message 14 on its control channel indicating that global challenge authentication is required at each system access. System access includes the initiation or termination of a call, and the periodic registration performed by the mobile station 12, i.e. typically every 10 minutes when the mobile station is powered so as to inform the cellular network of its location. Before performing periodic registration, the mobile station 12 determines whether global challenge is required upon periodic registration (step 16). The global challenge procedure consists of calculating at the mobile station an authentication signature based on its mobile station identification number and electronic serial number, and on a random number received from the MSC 10 and a shared secret data, using an algorithm called CAVE for AMPS and D-AMPS networks. If global challenge is required at system access, the mobile station calculates the authentication signature (also called Authr) (step 18), and sends the authentication signature (step 20) to the MSC 10 upon performing its registration.

The MSC 10 receives the authentication signature, and must verify its accuracy by performing authentication (step 22). For doing so, the MSC requests from a corresponding VLR 24, which can be co-located or not with the MSC 10, the shared secret data for that particular mobile station. The shared secret data is sent to the MSC (step 26), which then performs authentication. If the results of the authentication performed by the MSC are the same as the authentication signature received from the mobile station 12, the MSC informs the VLR (step 27) and updates the location of the mobile station (step 28). The MSC also allows the mobile station 12 to continue its system access (step 30).

However, as can be appreciated by those skilled in the art, the continuous recurrence of the global challenge performance at periodic registration causes an important processor load to the MSC. Furthermore, by repetitively performing global challenge at periodic registration while being static and idle, the risks of cloning the mobile station are increased due to the foreseeability of the periodic registration and the lack of movement and activity of the mobile station.

Figure 2:
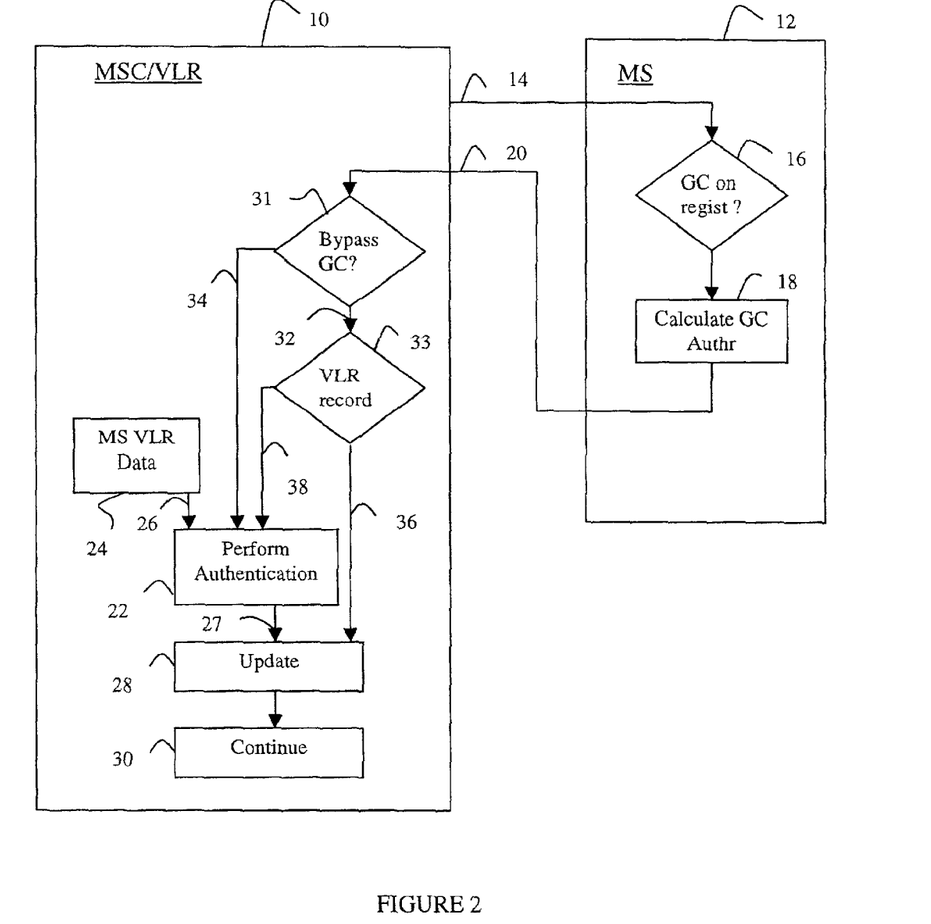
FIG. 2 is a functional block diagram of a method for handling global challenge authentication registration in accordance with a preferred embodiment of the present invention.

Reference is now made to FIG. 2, which shows a functional block diagram of a method for handling global challenge authentication registration in accordance with a preferred embodiment of the present invention. In that method, as previously described, the MSC 10 broadcast a message 14 on its control channel indicating that global challenge authentication is required at each system access. The mobile station 12 receives the message 14. Before performing periodic registration, the mobile station 12 determines whether global challenge is required upon periodic registration (step 16). If global challenge is required at system access, the mobile station calculates the authentication signature (also called Authr) (step 18), and includes the authentication signature in the registration message which is sent to the MSC 10 upon performing its registration (step 20).

The MSC 10 receives the registration message that includes the authentication signature, and determines whether it has capabilities for bypassing global challenge authentication (step 31). If the MSC has capabilities for bypassing global challenge authentication, it then performs a verification with a related Visitor Location Register (VLR), shown as co-located for the sake of clarity but those skilled in the art will readily understand that the VLR could also be a standalone node. The MSC verifies whether the VLR has a record for the mobile station from which the registration message has been received. The MSC 10 may also further verify whether the mobile station from which the registration has been received has previously succeeded authentication. If the VLR has a record for the mobile station, then the global challenge authentication is bypassed for the mobile station, and the MSC updates the location information in step 28 and the periodic registration is continued at step 30. However, if the VLR does not have a record for the mobile station, the global challenge authentication is performed at step 22, in a manner known in the art. Alternatively, if it is determined at step 31 that the MSC 10 does not have capabilities for bypassing global challenge authentication, the global challenge authentication is performed at step 22.

For performing the global challenge authentication at step 22, the MSC 10 requests from the VLR the shared secret data for that particular mobile station at step 24. If the results of the authentication performed by the MSC are the same as the authentication signature received from the mobile station 12, the MSC informs the VLR (step 27) that the MSC has received a registration for the mobile station (step 28), thus resetting a timer therein. Then, the MSC allows the mobile station 12 to continue its periodic registration (step 30).

Figure 3:
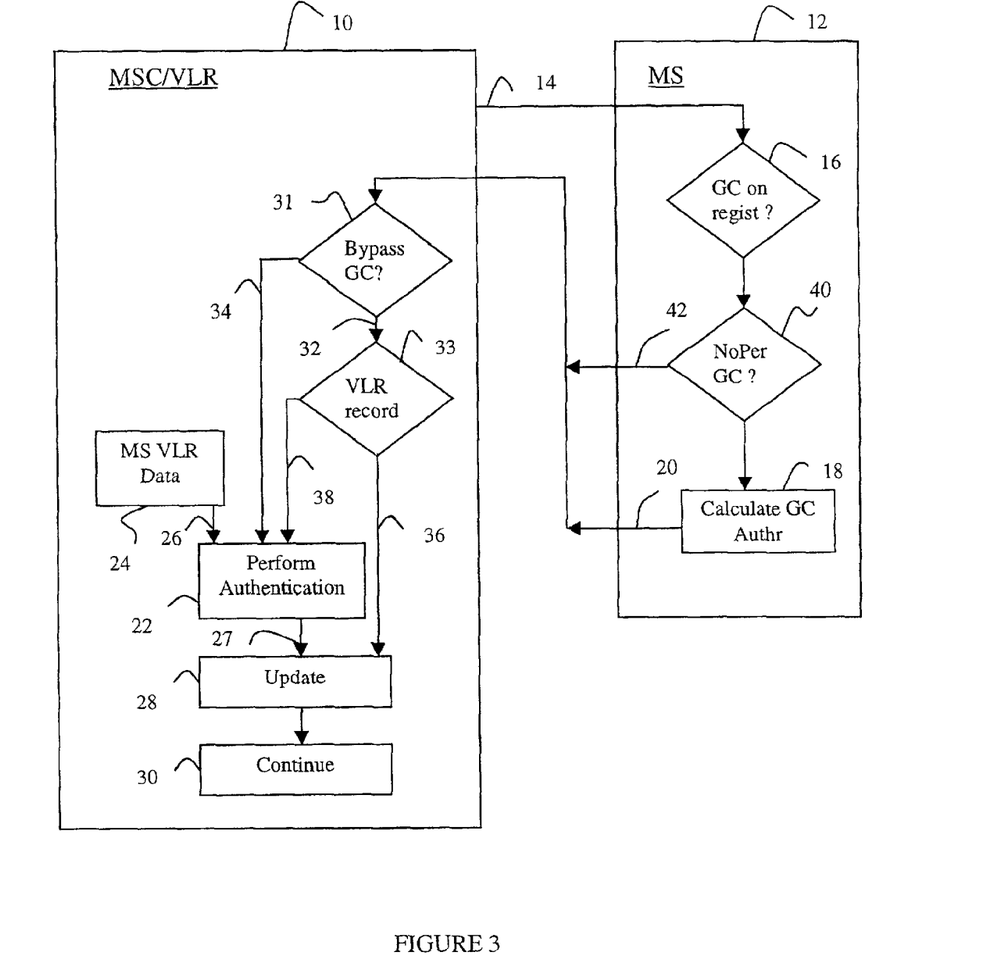
FIG. 3 is a functional block diagram of a method for handling global challenge authentication registration in accordance with another preferred embodiment of the present invention.

Referring now to FIG. 3, there is shown a functional block diagram of another preferred embodiment of the method for handling global challenge authentication of the present invention. In that embodiment, the MSC 10 broadcast the message 14 on its control channel indicating that global challenge authentication is required at system access, but with an indication to the effect that global challenge authentication is not required if the system access is a periodic registration.

The mobile station 12 receives the message 14. Before performing periodic registration, the mobile station 12 determines whether the message 14 received from the MSC indicates whether global challenge is required upon system access (step 16). If global challenge is required for system access, the mobile station 12 verifies (step 40) whether the message received included an indication that global challenge authentication is not required for periodic registration. If it is determined in step 40 that global challenge authentication is required for periodic registration, the method moves to step 18, where the mobile station 12 performs global challenge authentication calculation to obtain the authentication signature and includes the authentication signature in the registration message (step 20). In the alternative, if it has been determined in step 40 that global challenge authentication is not required for periodic registration, the registration message is sent (step 42) without including the authentication signature.

As previously described for FIG. 2, the MSC 10 receives the registration message, and determines whether it has capabilities for bypassing global challenge authentication (step 31). Reference is now additionally made to FIG. 5, where there is shown a more detailed functional block diagram of step 31, for determining whether to bypass global challenge in accordance with the present invention. More particularly, to determine whether the MSC has capabilities for bypassing global challenge, verification is made to determine whether the bypass global challenge feature is active in step 60. If the bypass global challenge feature is not active, it is determined that the MSC does not have capabilities for bypassing global challenge at step 61. Alternatively, if the bypass global challenge feature is active, a verification (step 62) is made to determine whether the indication (shown as NOPerGC) is sent on the control channel. For instances where the indication that global challenge authentication is not required for periodic registration has been sent on the control channel, it is determined that the MSC has capabilities for bypassing global challenge at step 64. Alternatively, when the indication that global challenge authentication is not required for periodic registration has not been send on the control channel, a verification (step 76) is made to determine whether statistical global challenge for periodic registrations are required. If statistical global challenge for periodic registrations are required, it is determined that the MSC does not have capabilities for bypassing global challenge for periodic registration at step 61, alternatively it is determined that the MSC has capabilities for bypassing global challenge for periodic registration at step 64.

Figure 5:
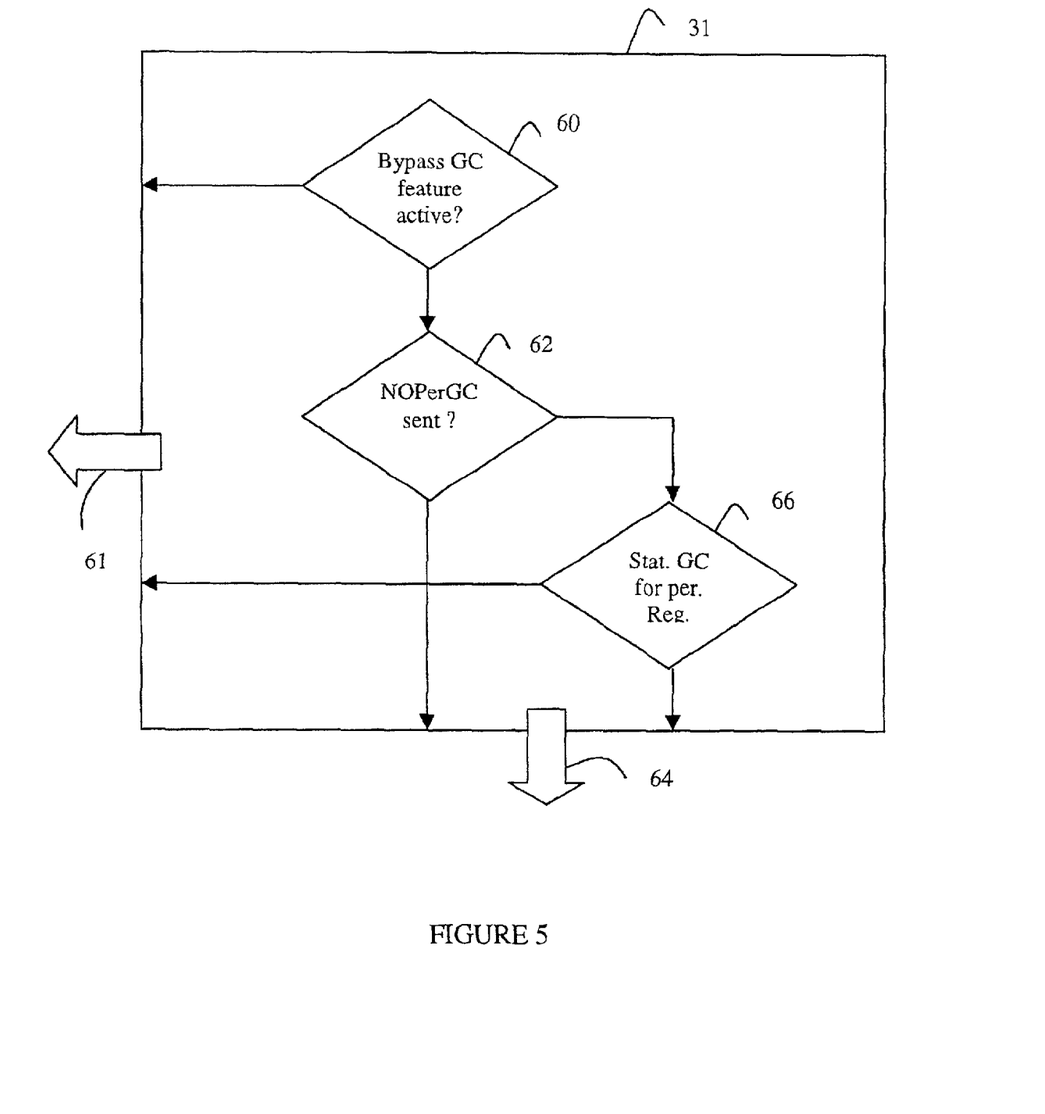
FIG. 5 is a functional block diagram of a step for determining whether to bypass global challenge in accordance with the teachings of the present invention.

If it is determined in step 31 that the MSC has capabilities for bypassing global challenge authentication, it then verifies with the related VLR, as previously described, that the VLR has a record for the mobile station from which the registration message has been received. If the VLR has a record for the mobile station, then the global challenge authentication is bypassed for the mobile station, and the MSC updates the location information in step 28 and the periodic registration is continued at step 30. However, if the VLR does not have a record for the mobile station, the global challenge authentication is performed at step 22, in a manner known in the art. Alternatively, if it is determined at step 31 that the MSC 10 does not have capabilities for bypassing global challenge authentication, the global challenge authentication is performed at step 22.

For performing the global challenge authentication at step 22, the MSC 10 requests from the VLR the shared secret data for that particular mobile station at step 24. If the results of the authentication performed by the MSC are the same as the authentication signature received from the mobile station 12, the MSC informs the VLR (step 27) that the MSC has received a registration for the mobile station (step 28), thus resetting a timer therein. Then, the MSC allows the mobile station 12 to continue its periodic registration (step 30).

Figure 4:
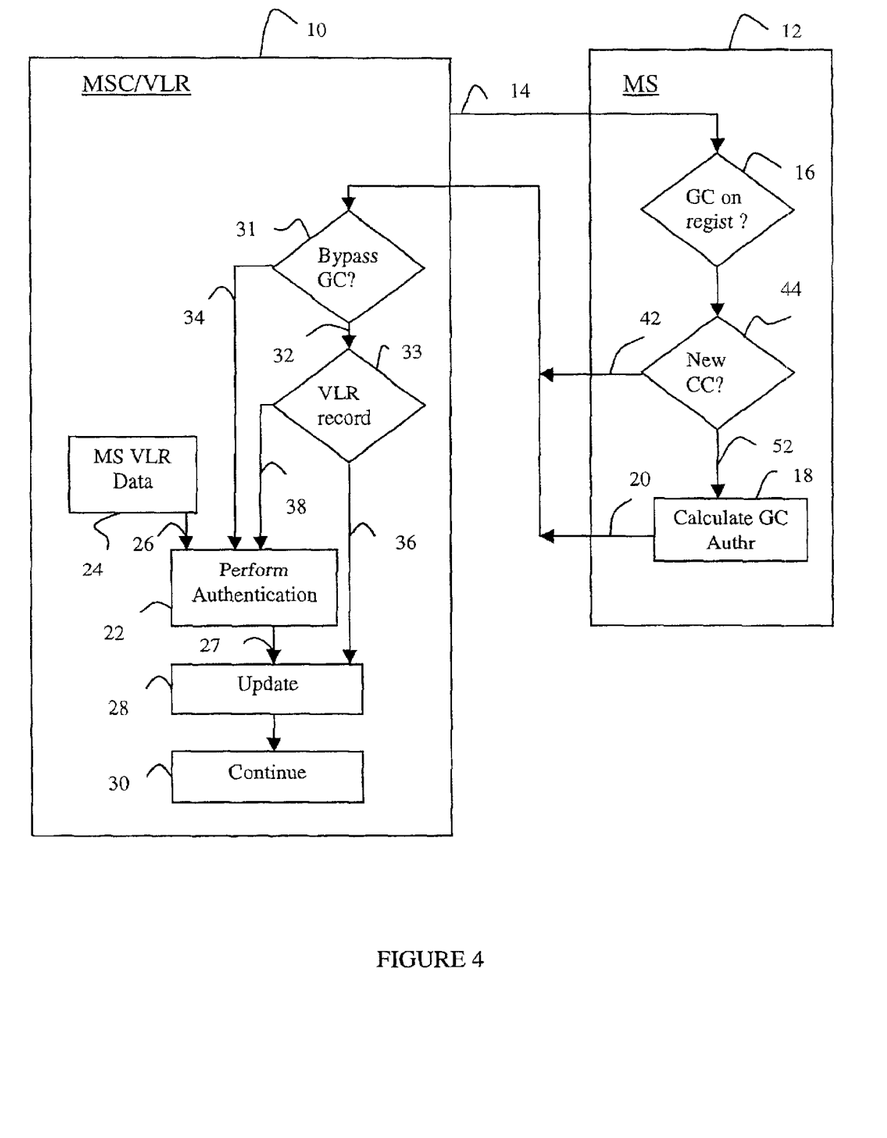
FIG. 4 is a functional block diagram of a method for handling global challenge authentication registration in accordance with another preferred embodiment of the present invention.

Referring now to FIG. 4, there is shown a functional block diagram of a method for handling global challenge authentication registration in accordance with another preferred embodiment of the present invention. In this other preferred embodiment, as previously described with respect to FIGS. 2 and 3, the MSC 10 broadcast the message 14 on its control channel indicating that global challenge authentication is required at system access. The mobile station 12 receives the message 14. Before performing periodic registration, the mobile station 12 determines whether the message 14 received from the MSC indicates whether global challenge is required upon system access (step 16). If global challenge is required for system access, the mobile station 12 verifies (step 44) whether the control channel is the same as when the last global challenge authentication was performed. If the control channel is not the same, the method moves to step 18, where the mobile station 12 performs global challenge authentication calculation to obtain the authentication signature and includes the authentication signature in the registration message (step 20). In the alternative, if it has been determined in step 44 that the control channel is the same, the registration message is sent (step 42) without including the authentication signature. The method then continues as described with respect to FIG. 3.

Figure 6:
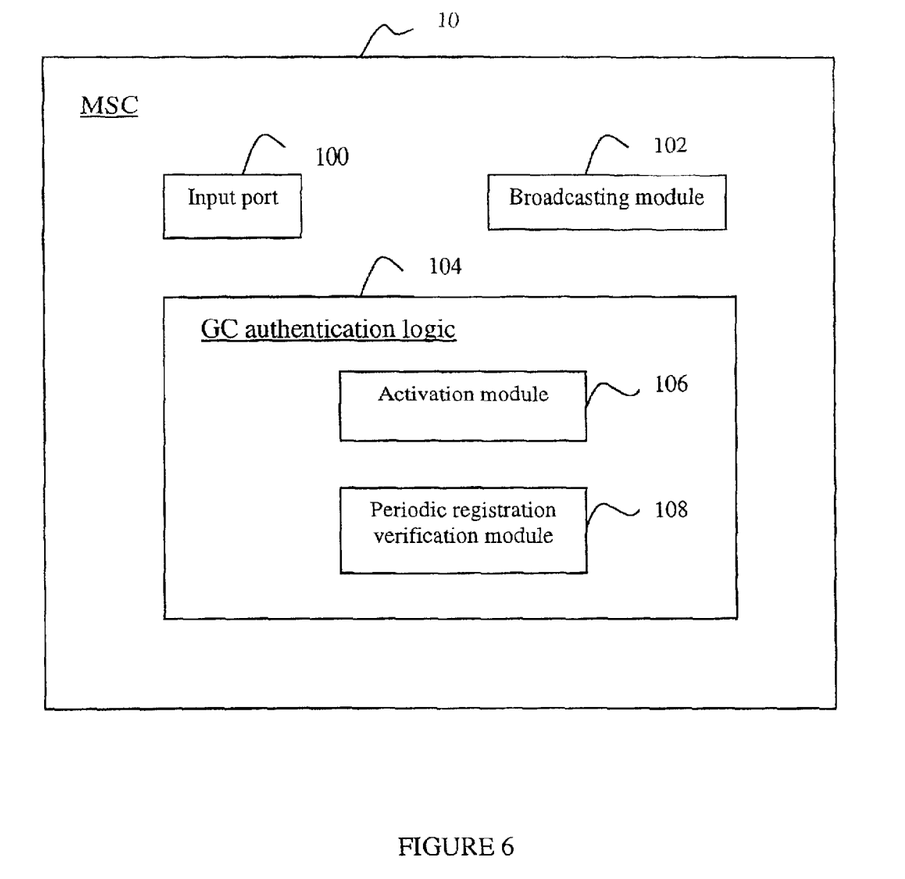
FIG. 6 is a Mobile Switching Center (MSC) for performing global challenge authentication registration handling in accordance with the teachings of the present invention.

Turning now to FIG. 6, there is shown a Mobile Switching Center (MSC) for performing global challenge authentication registration handling in accordance with the teachings of the present invention. The MSC 10 includes an input port 100 for receiving the registration message from the mobile station, as previously described with respect to FIGS. 2, 3 and 4. The MSC also includes global challenge authentication logic 104 for determining whether global challenge authentication is required for the mobile station from which the registration message has been received. The global challenge authentication logic 104 may consist for example of a process encoded in the MSC. The global challenge authentication logic further has capabilities for verifying that the Visitor Location Register (VLR) relating to the MSC has a record for the mobile station from which the registration message has been received, and/or that the mobile station from which the registration has been received has previously succeeded authentication.

The global challenge authentication logic consists of an activation module 106 for activating and deactivating the global challenge authentication logic. The global challenge authentication logic also has a periodic registration verification module 108 for tracking whether global challenge authentication is broadcast as required for periodic registration by a broadcasting module 102. The periodic registration verification module 108 has capabilities for initiating random global authentication when the global challenge authentication is broadcast as not required for periodic registration.

The MSC 10 also has a broadcasting module 102 for broadcasting on a control channel that global challenge authentication is required upon access to a cellular telecommunications network to which the MSC belongs. The broadcasting module 102 also has capabilities for broadcasting on the control channel that global challenge authentication is required upon access to a cellular telecommunications network to which the MSC belongs, but that global challenge authentication is not required for periodic registration to the cellular telecommunications network. It will be understood by those skilled in the art that the MSC 10 does not broadcast directly on the control channel, but rather that the MSC sends the broadcast to a base station serving the mobile station. It is than the base station that broadcast on its appropriate control channel that global challenge authentication is required upon access.

Figure 7:
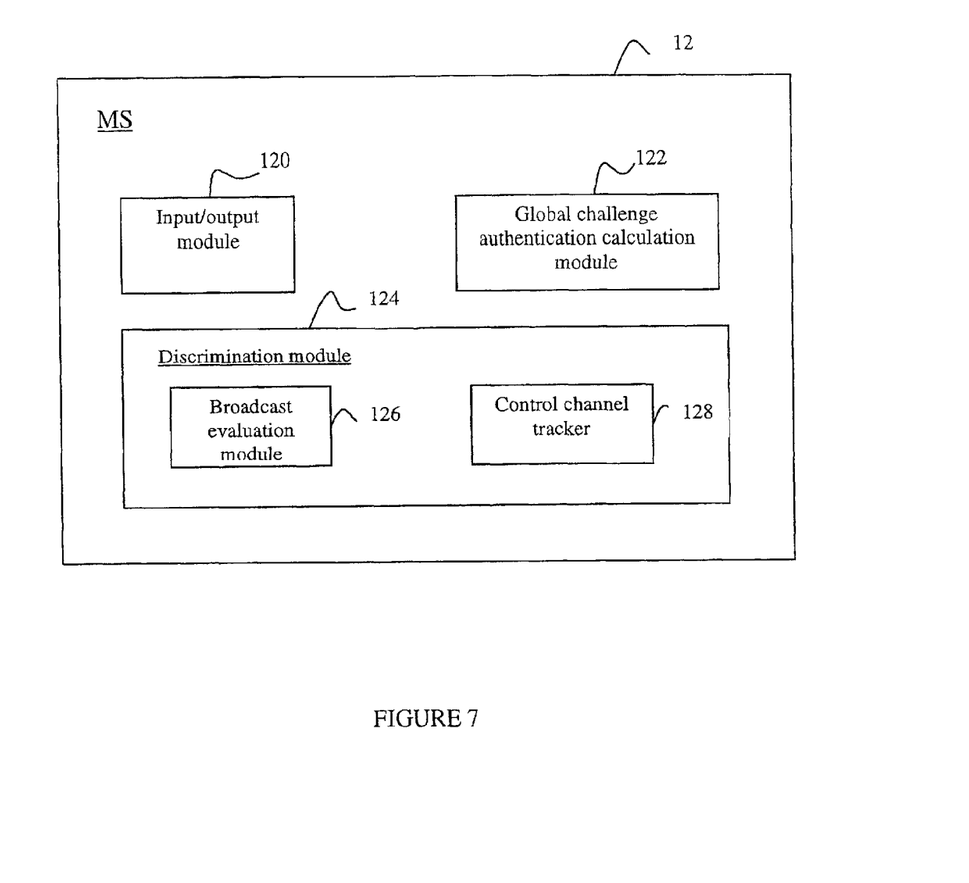
FIG. 7 is a mobile station for performing global challenge authentication registration handling in accordance with the teachings of the present invention.

Referring now to FIG. 7, there is shown a mobile station 12 for performing global challenge authentication registration handling in accordance with the teachings of the present invention. The mobile station 12 includes an input/output module 120 for receiving a broadcast on a control channel and for transmitting a periodic registration message. The input/output module may consist, without being limited thereto, of an antenna to which is connected a radio.

The mobile station 12 also includes a global challenge authentication calculation module 122 to compute an authentication signature, based on the mobile station identification number, electronic serial number, a random number received from the MSC, using the CAVE algorithm as previously described.

The mobile station 12 also includes a discrimination module 124 for determining whether the authentication signature is required for the periodic registration message. The discrimination module includes a control channel tracker 128 for determining whether the control channel is the same as when a previous periodic registration message was sent by the input/output module 120. The discrimination module 124 also includes a broadcast evaluation module 126 for determining whether the broadcast message received by the input/output module 120 indicates whether an authentication signature is required for periodic registration message. Hence, the authentication signature is computed and included in the periodic registration message if the discrimination module 124 determines that it is required, and the authentication signature is not computed if the discrimination module 124 determines that it is not required and the authentication signature is not included in the periodic registration message before it is sent by the input/output module 120.

It is thus believed that the operation and construction of the present invention will be apparent from the foregoing description. While the method, MSC and mobile station shown and described have been characterized as being preferred, it will be readily apparent that various changes and modifications could be made therein without departing from the spirit and scope of the invention as defined in the following claims.

What is claimed is:

1. A method for handling global challenge authentication registration in a cellular telecommunications network, the method comprising steps of:
   receiving at a Mobile Switching Center (MSC) a registration message from a mobile station;
   determining whether the MSC has capabilities for bypassing global challenge authentication;
   if the MSC has capabilities for bypassing global challenge authentication, verifying whether a Visitor Location Register (VLR) relating to the MSC has a record for the mobile station from which the registration message has been received and if so bypassing the global challenge authentication for the mobile station, else performing the global challenge authentication; and
   if the MSC does not have capabilities for bypassing global challenge authentication, performing the global challenge authentication for the mobile station from which the registration message has been received.

2. The method for handling global challenge authentication registration of claim 1,
   wherein the method further comprises a step of:
   informing the VLR that the MSC has received the registration message from the mobile station, and resetting a timer therein.

3. The method for handling global challenge authentication registration of claim 1, wherein the step of verifying whether the VLR relating to the MSC has a record for the mobile station from which the registration message has been received further includes a step of verifying whether the mobile station has previously succeeded authentication.

4. The method for handling global challenge authentication registration of claim 1, wherein before the step of receiving registration message at the MSC, the method comprises further steps of:
   broadcasting by the MSC on a control channel that global challenge authentication is required upon access to the cellular telecommunications network;
   receiving by the mobile station the broadcasting of the MSC;
   performing global challenge authentication calculation to obtain an authentication signature; and
   including the authentication signature in the registration message and sending the registration message.

5. The method for handling global challenge authentication registration of claim 4, further comprising steps of:
   after the step of receiving by the mobile station the broadcasting of the MSC, a step of determining whether the control channel is the same as when a previous registration was performed, and if the control channel is the same, the global challenge authentication calculation is not performed, and the registration is sent without the authentication signature.

6. The method for handling global challenge authentication registration of claim 1, wherein before the step of receiving a registration message at the MSC, the method comprises further steps of:
   broadcasting by the MSC on a control channel that global challenge authentication is required upon access to the cellular telecommunications network but that global challenge authentication is not required for periodic registration;
   receiving by the mobile station the broadcasting of the MSC;
   determining whether the broadcasting of the MSC indicates whether global challenge authentication is required for period registration;

if global challenge authentication is required for periodic registration, performing global challenge authentication calculation to obtain the authentication signature and including the authentication signature in the registration message; and if global challenge authentication is not required for periodic registration, sending the registration message without the authentication signature.

7. The method for handling global challenge authentication registration of claim 6, wherein the step of determining whether the MSC has capabilities for bypassing global challenge authentication comprises steps of:

determining whether a bypass global challenge feature is active;

if the bypass global challenge feature is not active, the MSC does not have capabilities for bypassing global challenge authentication;

if the bypass global challenge feature is active, verifying whether the MSC has broadcast global challenge authentication is not required for periodic registration, and if the MSC has broadcast that the global challenge authentication is not required for periodic registration, the MSC has capabilities for bypassing global challenge authentication;

if the bypass global challenge feature is active, and the MSC has not broadcast that the global challenge authentication is not required for periodic registration, verifying whether statistical global challenge authentication is to be performed for periodic registration;

if statistical global challenge authentication is to be performed for periodic registration, the MSC does not have capabilities for bypassing global challenge authentication; and if statistical global challenge authentication is not to be performed for periodic registration, the MSC has capabilities for bypassing global challenge authentication.

8. A Mobile Switching Center (MSC) for handling global challenge authentication registration, the MSC comprising:

an input port for receiving a registration message from a mobile station; and a global challenge authentication logic for determining whether global challenge authentication is required for the mobile station from which the registration message has been received.

9. The MSC of claim 8, wherein the global challenge authentication logic is capable of verifying that a Visitor Location Register (VLR) relating to the MSC has a record for the mobile station from which the registration message has been received.

10. The MSC of claim 9, wherein the global challenge authentication logic is further capable of verifying whether the mobile station from which the registration has been received has previously succeeded authentication.

11. The MSC of claim 8, further comprising a broadcasting module for broadcasting on a control channel that global challenge authentication is required upon access to a cellular telecommunications network to which the MSC belongs.

12. The MSC of claim 8, further comprising a broadcasting module for broadcasting on a control channel that global challenge authentication is required upon access to a cellular telecommunications network to which the MSC belongs, and that global challenge authentication is not required for periodic registration to the cellular telecommunications network.

13. The MSC of claim 8, wherein the global challenge authentication logic comprises:

an activation module for activating and deactivating the global challenge authentication logic; and a periodic registration verification module for tracking whether global challenge authentication is broadcast as required for periodic registration by the broadcasting module, wherein the periodic registration verification module initiates random global authentication when the global challenge authentication is broadcast as not required for periodic registration.

* * * * *